United States Patent
Wu et al.

(10) Patent No.: US 12,456,161 B2
(45) Date of Patent: Oct. 28, 2025

(54) PANORAMIC PHOTOGRAPHING APPARATUS, PANORAMIC PHOTOGRAPHING SYSTEM, PHOTOGRAPHING METHOD, AND AIRCRAFT

(71) Applicant: ARASHI VISION INC., Shenzhen (CN)

(72) Inventors: Qijiang Wu, Shenzhen (CN); Jingkang Liu, Shenzhen (CN); Kehui He, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 375 days.

(21) Appl. No.: 17/790,984

(22) PCT Filed: Jan. 7, 2021

(86) PCT No.: PCT/CN2021/070707
§ 371 (c)(1),
(2) Date: Jul. 6, 2022

(87) PCT Pub. No.: WO2021/139732
PCT Pub. Date: Jul. 15, 2021

(65) Prior Publication Data
US 2023/0043497 A1    Feb. 9, 2023

(30) Foreign Application Priority Data
Jan. 7, 2020   (CN) .......................... 202010015141.6

(51) Int. Cl.
*G06T 3/4038*   (2024.01)
*B64D 47/08*    (2006.01)
(Continued)

(52) U.S. Cl.
CPC ............ *G06T 3/4038* (2013.01); *B64D 47/08* (2013.01); *B64U 10/14* (2023.01); *G06T 7/174* (2017.01);
(Continued)

(58) Field of Classification Search
CPC ....... G06T 3/4038; G06T 7/174; B64D 47/08; B64U 10/14; B64U 2101/30;
(Continued)

(56) References Cited

U.S. PATENT DOCUMENTS

| | | |
|---|---|---|
| 2018/0186471 A1 | 7/2018 | Hutson et al. |
| 2018/0186472 A1 | 7/2018 | Wan et al. |

(Continued)

FOREIGN PATENT DOCUMENTS

| | | |
|---|---|---|
| CN | 205265789 U | 5/2016 |
| CN | 205675254 U | 11/2016 |

(Continued)

OTHER PUBLICATIONS

Office Action mailed Apr. 14, 2025, in European Application No. 21738752.1, 8 pages.

*Primary Examiner* — Charlotte M Baker
(74) *Attorney, Agent, or Firm* — XSENSUS LLP (57) ABSTRACT

The present invention is applicable to the technical field of aerial photography. Disclosed are a panoramic photographing apparatus, a panoramic photographing system, a photographing method, and an aircraft. The photographing apparatus comprises a support connected to an aircraft body and a photographing module mounted on the support. The photographing module comprises a first photographing module and a second photographing module arranged in a first direction and a second direction. The first direction is opposite to the second direction. A line of sight corresponding to a maximum angle of view of the first photographing (Continued)

module intersects a line of sight corresponding to a maximum angle of view of the second photographing module. The photographing method uses the photographing apparatus. The aircraft comprises the photographing apparatus. The panoramic photographing system comprises the remote terminal and the photographing apparatus/aircraft. In the panoramic photographing apparatus, the panoramic photographing system, the photographing method, and the aircraft provided by the present invention, the aircraft body and the photographing apparatus are completely hidden during capturing of a panoramic photo or a panoramic video, thereby ensuring a good panoramic photographing effect, and facilitating subsequent image processing.

18 Claims, 9 Drawing Sheets

(51) Int. Cl.
  *B64U 10/14* (2023.01)
  *G06T 7/174* (2017.01)
  *H04N 23/951* (2023.01)
  *H04N 23/957* (2023.01)
  *B64U 101/30* (2023.01)

(52) U.S. Cl.
  CPC ......... *H04N 23/951* (2023.01); *H04N 23/957* (2023.01); *B64U 2101/30* (2023.01)

(58) Field of Classification Search
  CPC ...... F16M 11/041; F16M 11/22; F16M 13/02; G03B 15/006; G03B 37/04; H04N 23/951; H04N 23/685; H04N 23/695; H04N 23/90; H04N 23/957; H04N 23/698; H04N 23/57; H04N 23/55
  USPC ......................................................... 382/284
  See application file for complete search history.

(56) References Cited

U.S. PATENT DOCUMENTS

2018/0297716 A1* 10/2018 Ni .................. G05D 1/0094
2019/0002124 A1   1/2019 Garvin
2019/0042530 A1*  2/2019 Wang ..................... H03M 1/66

FOREIGN PATENT DOCUMENTS

| CN | 205847409 U | 12/2016 |
| CN | 107891991 A | 4/2018 |
| CN | 108725815 A | 11/2018 |
| EP | 3190460 A1 | 7/2017 |
| EP | 3412579 B1 | 11/2019 |
| WO | 2019234945 A1 | 12/2019 |

\* cited by examiner

PANORAMIC PHOTOGRAPHING APPARATUS, PANORAMIC PHOTOGRAPHING SYSTEM, PHOTOGRAPHING METHOD, AND AIRCRAFT

CROSS-REFERENCE TO RELATED APPLICATIONS

This application is a National Phase entry under 35 U.S.C. § 371 of International Application No. PCT/CN2021/070707, with an international filing date of Jan. 7, 2021, which is based upon and claims priority to Chinese Patent Application No. 202010015141.6, filed with the Chinese Patent Office on Jan. 7, 2020, titled "Panoramic photographing apparatus, panoramic photographing system, photographing method and aircraft", the entire contents of which are incorporated herein by reference.

TECHNICAL FIELD

The present application relates to the technical field of aerial photography, and in particular, relates to a panoramic photographing device, a panoramic photographing system, a photographing method and an aircraft.

BACKGROUND

An unmanned aerial vehicle (UAV) is an unmanned aircraft operated by a radio remote control equipment and a self-provided program control device, or operated independently by a computer completely or intermittently.

SUMMARY

In an aspect, an embodiment of the present application discloses a panoramic photographing device which includes a bracket for being connected with an aircraft body and a photographing module mounted on the bracket, wherein the photographing module includes a first photographing module disposed towards a first direction and a second photographing module disposed towards a second direction, the first direction is opposite to the second direction, and a line of sight corresponding to the maximum viewing angle of the first photographing module intersects with a line of sight corresponding to the maximum viewing angle of the second photographing module.

In another aspect, an embodiment of the present application further discloses a photographing method, which includes the following steps:
  acquiring a first image in a first direction by a first photographing module of the panoramic photographing device described above, and acquiring a second image in a second direction by a second photographing module of the panoramic photographing device;
  receiving the first image and the second image of the first photographing module and the second photographing module by a processing module of the panoramic photographing device or an aircraft, and combining the first image and the second image to form a panoramic image and sending the panoramic image to a remote terminal; or receiving the first image and the second image of the first photographing module and the second photographing module by the remote terminal and combining the first image and the second image to form a panoramic image.

In another aspect, an embodiment of the present application further discloses an aircraft which includes an aircraft body and the panoramic photographing device described above, wherein the bracket is detachably fixed on a part of the aircraft body.

BRIEF DESCRIPTION OF THE DRAWINGS

In order to explain technical solutions in the embodiments of the present application more clearly, attached drawings required in the embodiments will be briefly introduced hereinafter. Obviously, the attached drawings in the following description are only some embodiments of the present application, and other attached drawings can be obtained by those of ordinary skill in the art according to these attached drawings without creative labor.

In the attached drawings:
  1. Photographing module; 11. First photographing module; 12. Second photographing module; 111. Limiting groove; 121. Slider;

2. Bracket; 21. First clamping part; 211. First bracket; 212. First fastening member; 22. Second clamping part; 221. Second bracket; 222. Second fastening member; 23. Fastening structure; 231. Fastening nut; 232. Fastening projection; 233. Fastening bolt; 24. Mounting table; 241. Elastic arm; 242. Limiting projection; 243. Sliding groove; 25. Host module;

3. Aircraft body.

DETAILED DESCRIPTION

In order to make objectives, technical solutions and advantages of the present application clearer, the present application will be further described in detail with reference to attached drawings and embodiments. It shall be appreciated that, the specific embodiments described herein are only used for explaining the present application, and are not intended to limit the present application.

It shall be noted that, terms "arrangement" and "connection" should be understood broadly, for example, they may include direct arrangement and connection, or indirect arrangement and connection through an intervening component or intervening structure.

In addition, if terms indicating orientation or position relationships such as "longitudinal", "horizontal", "length", "width", "thickness", "upper", "lower", "front", "back", "left", "right", "vertical", "horizontal", "top", "bottom", "inside", "outside" are used in the embodiments of the present application, these terms are based on orientation or position relationships shown in the attached drawings or common states for placement or usage. These terms are only used for convenience of description of the present application and simplification of the description, and are not intended to indicate or imply that the structures, features, devices or elements mentioned must have specific orientation or position relationships or constructed and operated in a specific orientation. Thus, these terms should not be construed as limitation of the present application. In the description of the present application, the term "a plurality of" means the number is two or more unless otherwise stated.

The specific technical features and embodiments described in the detailed description may be combined in any suitable manner without contradiction. For example, different embodiments may be formed by combining different specific technical features/embodiments. In order to avoid unnecessary repetition, various possible combinations of specific technical features/embodiments in the present application will not be further described herein.

Civil aircrafts (unmanned aerial vehicles) are generally equipped with photographing devices, which are used for photographing during the flight of the aircraft. The aircraft body and the photographing device of the aircraft are not hidden in panoramic photographing. For example, the aircraft body or the photographing device is likely to appear in photos or videos taken by the aircraft, which affects the quality of the photos or the videos. When panoramic photos or panoramic videos are taken by the aircraft, the aircraft body or the propeller of the aircraft blocks the images more seriously, which results in complicated post processing of images.

Some embodiments of the present application siaclose a panoramic photographing, a photographing method and an aircraft, which hide the aircraft body and the photographing device when panoramic photos or panoramic videos are taken by the aircraft.

Figure 1:
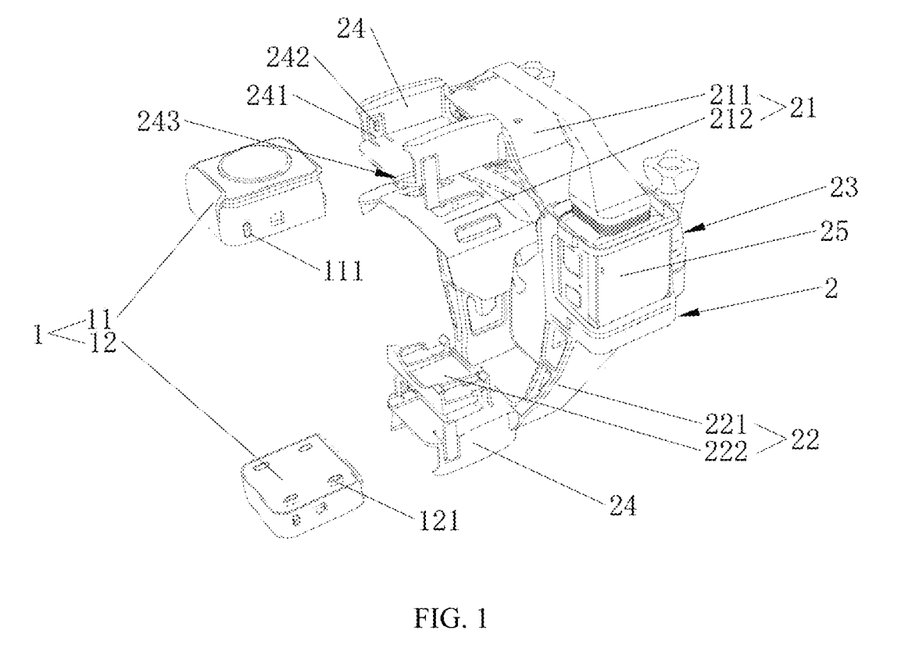
FIG. 1 is a schematic view illustrating the perspective structure of a panoramic photographing device according to an embodiment of the present application.
Figure 9:
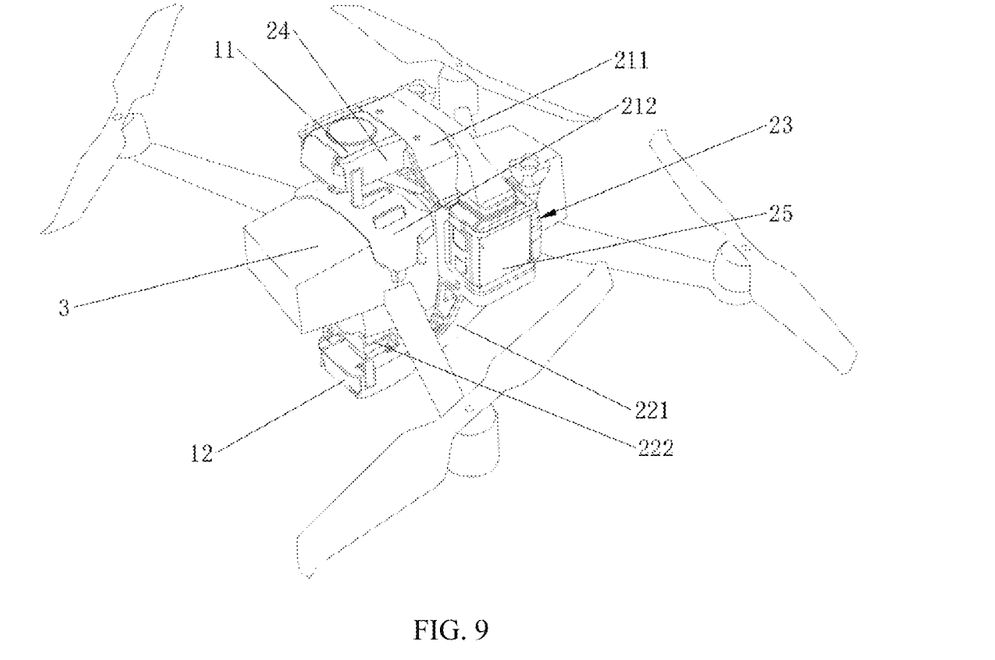
FIG. 9 is a schematic view illustrating the perspective structure of an aircraft according to an embodiment of the present application.

As shown in FIG. 1 and FIG. 9, in one embodiment of the present application, a panoramic photographing device includes a bracket 2 connected with an aircraft body 3 and a photographing module 1 installed on the bracket 2. The photographing module 1 includes a first photographing module 11 disposed towards a first direction and a second photographing module 12 disposed towards a second direction, and the first direction is opposite to the second direction. A line of sight corresponding to the maximum viewing angle of the first photographing module 11 of the aircraft body 3 intersects with a line of sight corresponding to the maximum viewing angle of the second photographing module 12 (see FIG. 10). That is, the maximum image range that the first photographing module 11 can acquire partially overlaps with the maximum image range that the second photographing module 12 can acquire, so as to form a panoramic image (picture or video). The first photographing module 11 photographs an image in the first direction, and the second photographing module 12 photographs an image in the second direction. The images photographed by the first photographing module 11 and the second photographing module 12 are stored and combined by software so that a panoramic photo or panoramic video is obtained. In some embodiments, the aircraft body 3 is located in the blind area of the first photographing module 11 and the second photographing module 12, the aircraft body and the photographing device are hidden when photographing panoramic photos, and the aircraft body or the photographing device are not block the panoramic images so that the panoramic images are great and the post processing of images is simpler.

Figure 10:
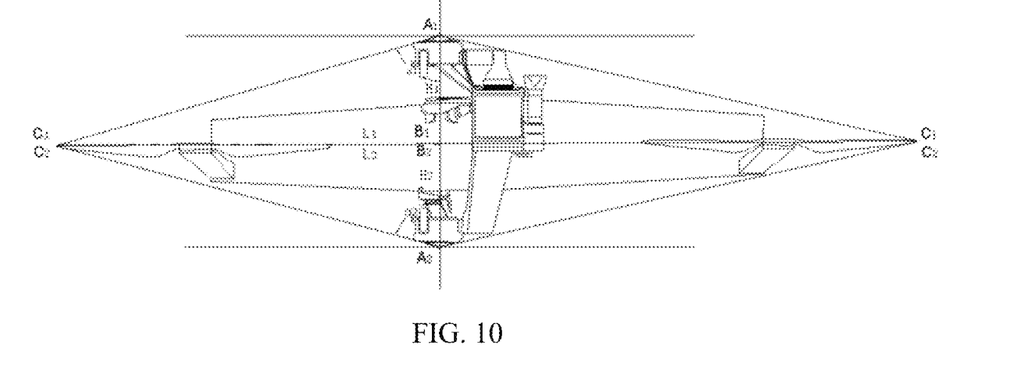
FIG. 10 is a schematic view illustrating line-of-sight analysis of a photographing module in an aircraft according to an embodiment of the present application.

In some embodiments, neither the line of sight corresponding to the maximum viewing angle of the first photographing module 11 nor the line of sight corresponding to the maximum viewing angle of the second photographing module 12 intersects with the bracket 2 and the aircraft body 3. As a result, when a panoramic photographing system composed of the aircraft and the panoramic photographing device is used for panoramic photographing, the aircraft is hidden in the photographing process, and the processing for the panoramic image is simple and fast.

In this embodiment, a multi-axis rotary-wing UAV is taken as an example for the aircraft, and the viewing angle of the picture photographed by the first photographing module 11 is greater than 180 degrees, and the viewing angle of the picture photographed by the second photographing module 12 is also greater than 180 degrees accordance with some embodiments. That is, the maximum viewing angles of both the first photographing module 11 and the second photographing module 12 are greater than 180 degrees. Moreover, the lines of sight corresponding to the maximum viewing angles of the first photographing module 11 and the second photographing module 12 intersect at the peripheral side of the aircraft body 3 (see FIG. 10). In some embodiments, the aircraft body 3 and the bracket are located in the blind area of the photographing module 1 (that is, the aircraft as a whole is outside the viewing angle of the photographing module 1), the images photographed by the first photographing module 11 and the second photographing module 12 are directly combined to obtain a complete panoramic image, and the processing for the panoramic image is simple and fast.

In this embodiment, the first direction is a direction towards the upper part of the aircraft body 3, and the second direction is a direction towards the lower part of the aircraft body 3. That is, the first photographing module 11 is located above the aircraft body 3 with the lens facing upwards, and the second photographing module 12 is located below the aircraft body 3 with the lens facing downwards. The orientation of the lenses of the first photographing module 11 and the second photographing module 12 are all facing away from the aircraft body 3, so that the aircraft body 3 is located in the blind areas of the first photographing module 11 and the second photographing module 12. Of course, in some embodiments, the first direction is a direction towards the left part of the aircraft body 3 and the second direction is a direction towards the right part of the aircraft body 3, or the like. That is, the first photographing module 11 and the second photographing module 12 are located on the left and right sides of the aircraft body 3 or the like. In some embodiments, the first photographing module 11 and the second photographing module 12 are respectively arranged at the top and bottom of the bracket 2 (i.e., above and below the aircraft), or at both sides of the bracket 2 (i.e., both sides of the aircraft) or arranged obliquely above and below the bracket 2 or the like.

In specific applications, each of the first photographing module 11 and the second photographing module 12 includes one, two or more imaging lenses. When each of the first photographing module 11 and the second photographing module 12 includes a plurality of imaging lenses, the maximum viewing angle of the first photographing module 11 is the maximum viewing angle formed by the superposition of the viewing angles of the imaging lenses, and similarly, the maximum viewing angle of the second photographing module 12 is the maximum viewing angle formed by the superposition of the viewing angles of the imaging lenses. Of course, in some embodiments, each of the first photographing module 11 and the second photographing module 12 includes one fisheye camera, and the maximum viewing angle of the fisheye camera is the maximum viewing angle of the first photographing module 11 or the second photographing module 12. In some embodiments, the photographing module 1 is placed on a rotating tripod head, and images in different directions are obtained by the photographing module 1 through the rotation of the rotating tripod head, and then combined by software.

In some embodiments, each of the first photographing module 11 and the second photographing module 12 includes at least one fisheye camera. The maximum viewing angle of the fisheye camera is greater than 180 degrees, and the fisheye camera reaches a larger photographing angle, so as to reduce the number of cameras of the photographing module, thereby reducing the weight of the photographing device and further increasing the flying height and mileage of the aircraft. In this embodiment, the first photographing module 11 and the second photographing module 12 are the same, but they are installed at different positions and orientations.

In some embodiments, as shown in FIG. 1, the bracket 2 includes a first clamping part 21 and a second clamping part 22. The first clamping part 21 and the second clamping part 22 are connected and form a clamping structure for clamping the aircraft body 3, and there is a mounting space for accommodating the aircraft between the first clamping part 21 and the second clamping part 22. The bracket 2 may be open (e.g., C-shaped) or closed (e.g., have a shape of character "□") or the like. The bracket 2 is detachably connected to the aircraft, and the photographing device is removed from the aircraft body 3 when panoramic aerial photography is not performed. When the panoramic aerial photography is performed, the photographing device is installed on the aircraft body 3 through the clamping structure formed by the first clamping part 21 and the second clamping part 22. The clamping structure makes the photographing device adapted to various types (different sizes) of aircrafts and improve the practicability of the photographing device. In some embodiments, the bracket 2 is connected to the aircraft body 3 through a locking structure, a buckling structure or a strap structure or the like. For example, the locking structure is a screw, and the bracket 2 is suitable for being installed and detachably fixed on a part of the aircraft body by using the screw.

In specific applications, the first clamping part 21 and the second clamping part 22 are clamped at the top and bottom of the aircraft body 3, or at both sides of the aircraft body 3. In some embodiments, shapes of bodies are different for aircrafts of different models, and the photographing device is adapted to aircrafts of various shapes by being clamped by the clamping structure.

Figure 3:
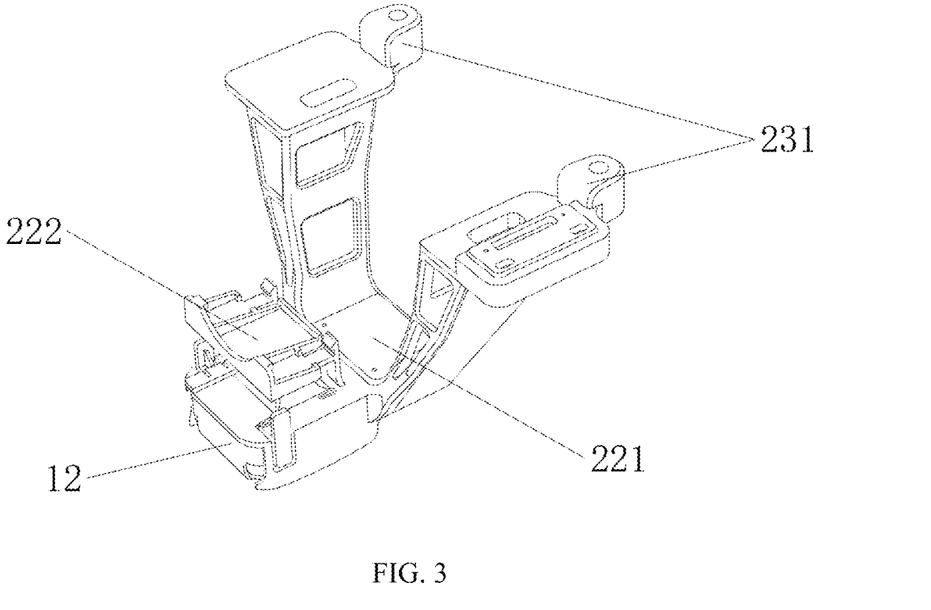
FIG. 3 is a schematic view illustrating the perspective structure of a second clamping part of a panoramic photographing device according to an embodiment of the present application.
Figure 4:
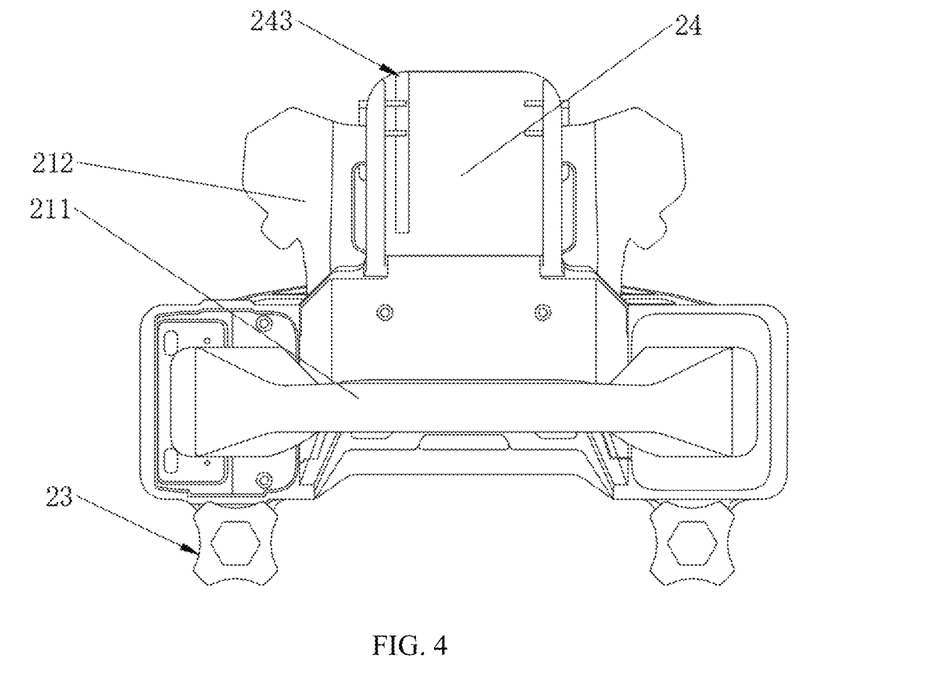
FIG. 4 is a top view of a panoramic photographing device according to an embodiment of the present application.

In some embodiments, as shown in FIG. 3 and FIG. 4, the first clamping part 21 is integrally formed or formed by assembling at least two assembly pieces. The second clamping part 22 is integrally formed or formed by assembling at least two assembly pieces. When a certain assembly piece is damaged, purchase a new assembly piece and replace the damaged assembly piece without replacing the whole bracket 2, thereby effectively reducing the maintenance cost of the photographing device. Moreover, different sizes of assembly pieces are selected for replacement so as to be adapted for use in different aircrafts.

In some embodiments, the first clamping part 21 and the second clamping part 22 are made of plastic or light alloy, and hollows are appropriately provided at some non-critical positions to reduce the weight of the photographing device, thereby increasing the flying height and mileage of the aircraft.

Figure 5:
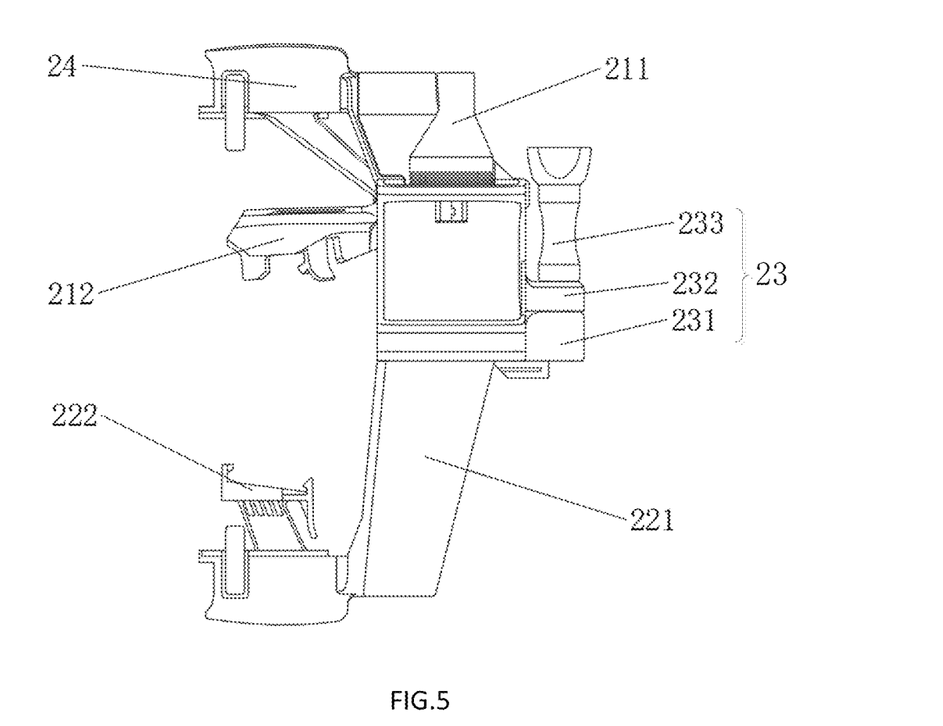
FIG. 5 is a right view of a panoramic photographing device according to an embodiment of the present application.
Figure 6:
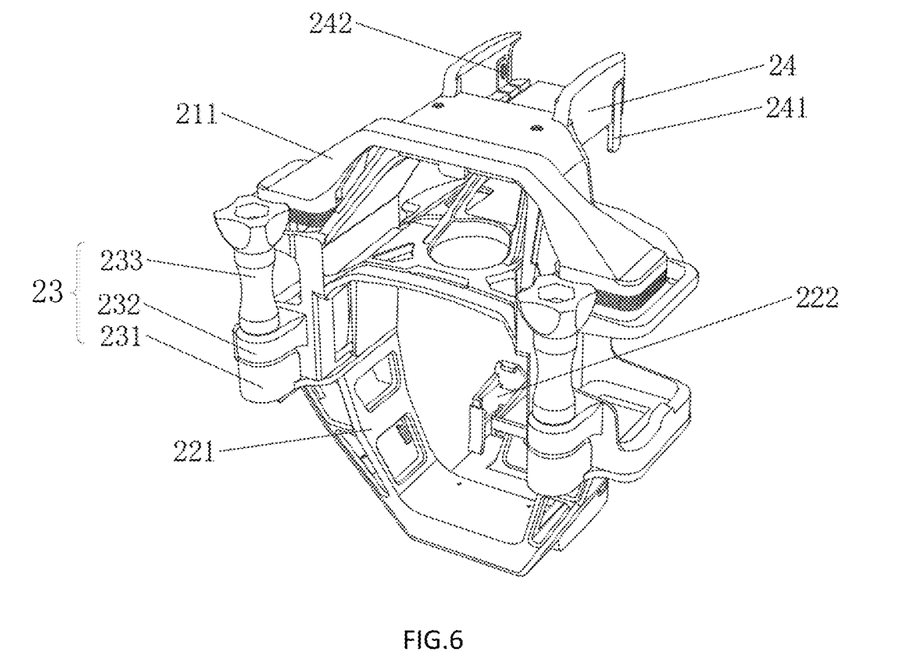
FIG. 6 is a schematic view illustrating the perspective structure of a panoramic photographing device according to an embodiment of the present application from another perspective.

In some embodiments, as shown in FIG. 5 and FIG. 6, a fastening structure 23 is provided between the first clamping part 21 and the second clamping part 22, and the fastening structure 23 is a buckle or a threaded locking structure or the like. The fastening structure 23 adjusts the distance between the first clamping part 21 and the second clamping part 22. That is, the fastening structure 23 adjusts the tightness of the clamping structure when it is clamped on the aircraft body 3. On the one hand, this makes application to aircraft bodies 3 of different sizes possible, and on the other hand, this makes the connection between the photographing device and the aircraft body 3 more secure. As a result, the photographing device is more reliable and stable during aerial photographing, and the pictures photographed are better.

Figure 2:
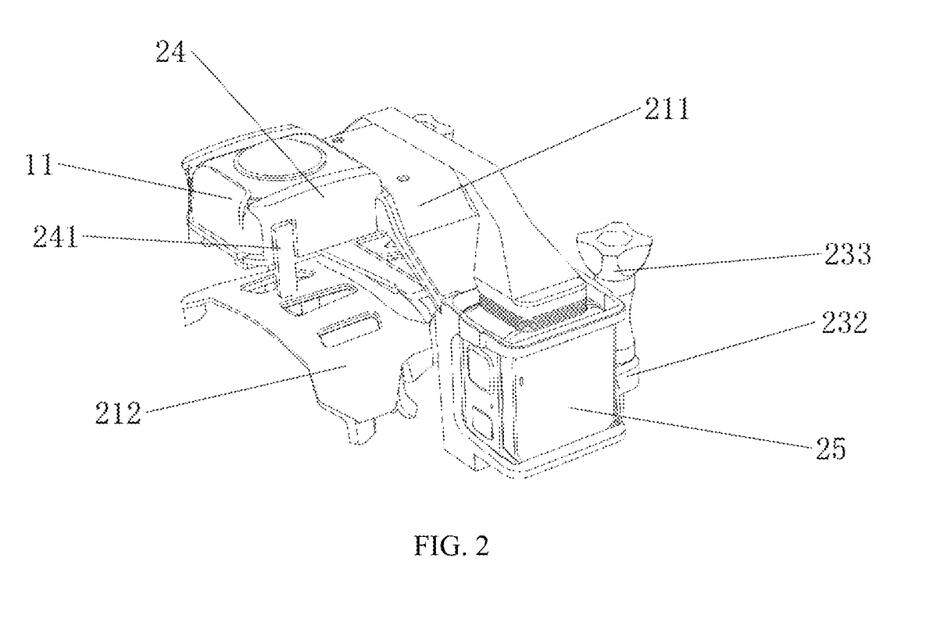
FIG. 2 is a schematic view illustrating the perspective structure of a first clamping part of a panoramic photographing device according to an embodiment of the present application.

In some embodiments, as shown in FIG. 1 to FIG. 3, the first clamping part 21 includes a first bracket 211 and a first fastening member 212 connected to the first bracket 211, and the second clamping part 22 includes a second bracket 221 and a second fastening member 222 connected to the second bracket 221. In accordance with some embodiments, the first bracket 211 is detachably connected to the second bracket 221, and the first bracket 211 or/and the second bracket 221 are U-shaped structures. A space formed between the first bracket 211 and the second bracket 221 is used to accommodate the aircraft body 3. In some embodiments, the first bracket 211 is integrally formed with the second bracket 221.

Figure 8:
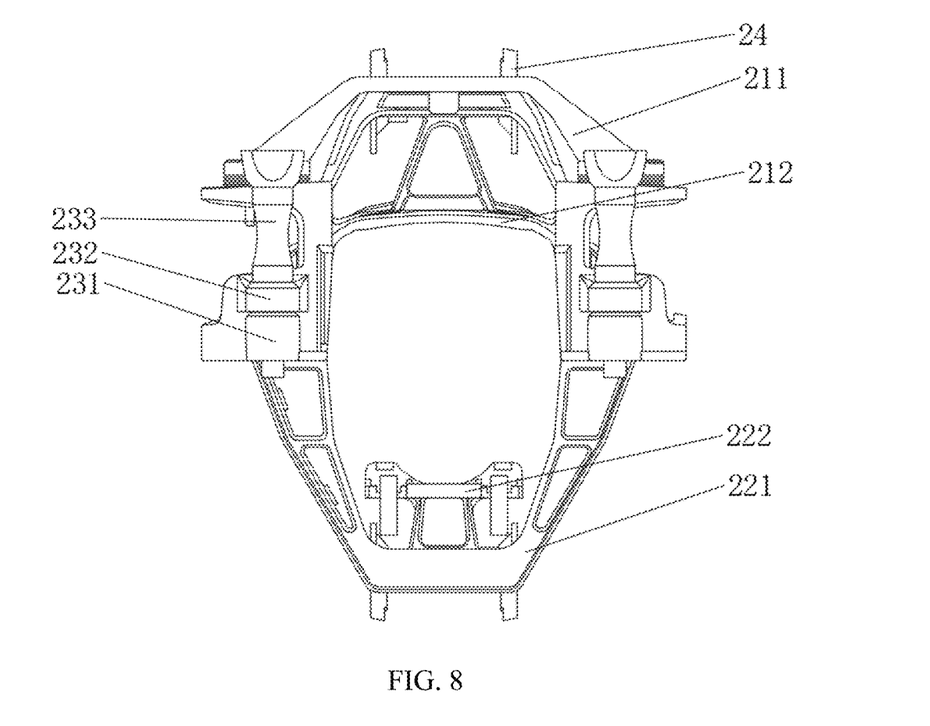
FIG. 8 is a rear view of a panoramic photographing device according to an embodiment of the present application.

In this embodiment, as shown in FIG. 6 and FIG. 8, the fastening structure 23 adopts a threaded locking structure, and the threaded locking structure includes a fastening protrusion 232 integrally or fixedly connected to the first bracket 211 and having a through via, a fastening nut 231 integrally or fixedly connected to the second bracket 221, and a fastening bolt 233 connected with the fastening nut 231 through thread connection after passing through the through via. When the fastening bolt 233 is tightened, the fastening bolt 233 continuously presses the fastening projection 232 to continuously move close to the fastening nut 231 so that the first bracket 211 and the second bracket 221 approach each other continuously, and thus the first fastening member 212 and the second fastening member 222 fasten the aircraft body 3. In this embodiment, there are two threaded locking structures, which are respectively arranged on both sides of the bracket 2. In some embodiments, one or more threaded fastening structures 23 are provided. Of course, the effect of fastening is also be achieved by connecting the fastening nut 231 to the first bracket 211, and connecting the fastening protrusion 232 to the second bracket 221. Of course, in some embodiments, different fastening methods also are adopted.

In some embodiments, the fastening structure 23 directly acts on the clamping structure. For example, the first fastening member 212 is slidably connected to the first bracket 211, the second fastening member 222 is fixedly connected or slidably connected to the second bracket 221, the first fastening member 212 and the second fastening member 222 move closer or farther away from each other by sliding, and the fastening protrusion 232 is fixedly connected or integrally formed with the first fastening member 212. The fastening nut 231 is fixedly connected or integrally formed with the second fastening member 222, and the clamping structure fastens the aircraft body 3 by continuously tightening the fastening bolt 233 to make the first fastening member 212 and the second fastening member 222 approach each other continuously.

Figure 7:
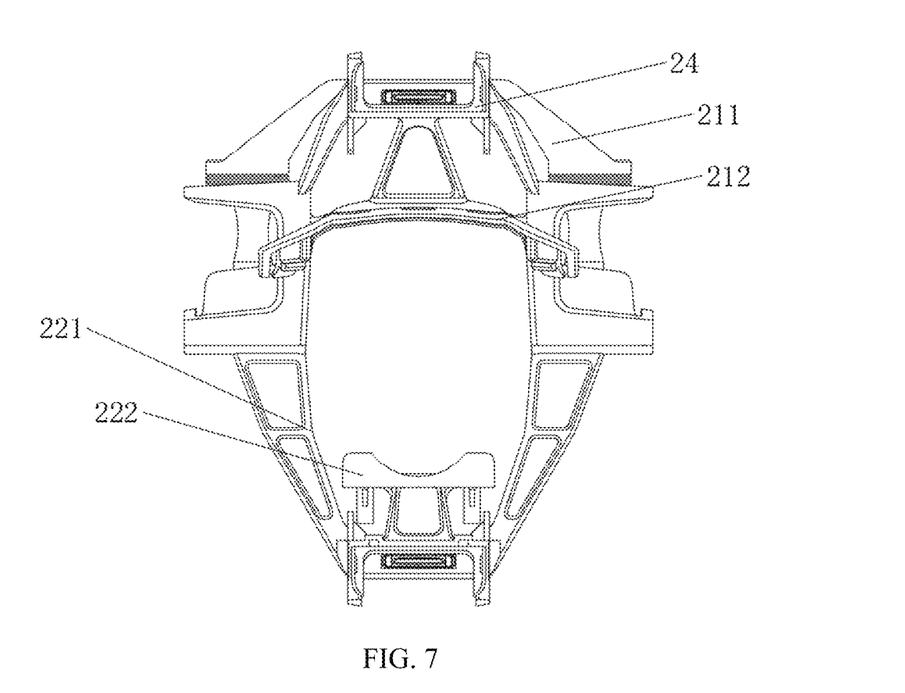
FIG. 7 is a front view of a panoramic photographing device according to an embodiment of the present application.

In some embodiments, as shown in FIG. 7, the first fastening member 212 and the second fastening member 222 are arc-shaped plates with certain elasticity, and the arc-shaped plates with elasticity is adapted to various aircraft bodies 3 better, thereby further improving the practicability of the photographing device. In this embodiment, the first fastening member 212 is an arc-shaped plate, and the second fastening member 222 is a flat plate whose size is smaller than that of the first fastening member 212. This design reduces the weight of the photographing device as much as possible without reducing the reliability of the clamping structure, and further increase the flying height and mileage of the aircraft.

In some embodiments, as shown in FIG. 1, the upper and lower ends of the bracket 2 are respectively provided with mounting structures for mounting the photographing module 1. That is, each of the first clamping part 21 and the second clamping part 22 is provided with a mounting structure for mounting the photographing module 1. The first photographing module 11 is mounted on the first clamping part 21 and the second photographing module 12 is mounted on the second clamping part 22 through the mounting structures. With such a modular and detachable design, in some embodiments, different photographing modules 1 are replaced according to different requirements to achieve different photographing effects, and meanwhile, it is convenient for maintenance.

In some embodiments, the mounting structure is provided with an adjusting structure for adjusting the planar position or/and the longitudinal position of the photographing module 1. The adjusting structure is configured to adjust the position of the photographing module 1 relative to the bracket 2. That is, the photographing module 1 is moved horizontally or moved up and down vertically (to adjust the distance between the photographing module 1 and the aircraft) through the adjusting structure. In some embodiments, there are various types of aircrafts, and after the photographing device is installed, the photographing module 1 is not located at the best photographing position. At this time, the position of the photographing module 1 is adjusted by the adjusting structure to adjust the picture viewing angle of the photographing module 1, so that best pictures are photographed by the photographing module 1.

In some embodiments, as shown in FIG. 1, the mounting structure includes two mounting tables 24, which are respectively used for mounting the first photographing module 11 and the second photographing module 12. Each of the mounting tables 24 has an mounting groove for accommodating the photographing module 1, and two sides of the mounting groove are provided with elastic arms 241, one side of the elastic arms 241 facing the mounting groove is provided with a limiting protrusion 242, and limiting grooves 111 engaged with the limiting protrusions 242 are provided at corresponding positions on the two sides of the first photographing module 11 and the second photographing module 12. The photographing module 1 is mounted in the mounting groove through the engagement of the limiting groove 111 with the limiting protrusion 242. Of course, in some embodiments, the first photographing module 11 and the second photographing module 12 are fixed on the mounting tables 24 by other buckling structures. Of course, in specific applications, different mounting structures also are adopted.

In some embodiments a plurality of limiting grooves 111 are horizontally arranged, and different limiting grooves 111 are engaged with the limiting protrusions 242 to adjust the mounting position of the photographing module, thereby improving the applicability of the photographing device.

In some embodiments, the bottom of the mounting groove is provided with a sliding groove 243, and the bottom of the photographing module 1 is provided with a slider 121 slidably connected with the sliding groove 243. During the installation of the photographing module 1, the slider 121 and the sliding groove 243 are used to guide the photographing module to be mounted in the mounting groove.

In some embodiments, in some embodiments, the adjusting structure is a planar tripod head or a lifting tripod head. The planar tripod head or the lifting tripod head automatically or manually adjust the position of the mounting structure relative to the aircraft so as to adjust the position of the photographing module and make the photographing module located at the best position for photographing. In some embodiments, the planar tripod head or the lifting tripod head has a certain anti-shake function. During the flight of the aircraft, the photographing device is likely to shake due to the disturbance of air flow or the vibration of wings of the aircraft, which leads to poor effect of pictures photographed by the photographing device. The planar tripod head or the lifting tripod head decreases the influence caused by the disturbance of air flow or the vibration of the wings through automatic adjustment so that the photographing module 1 is in a stable state, thereby improving the quality of pictures photographed by the photographing device.

In some embodiments, as shown in FIG. 1, the panoramic photographing device further includes a host module 25 arranged on the bracket 2, and the host module 25 includes at least one of a storage module for storing images photographed by the photographing module, a processing module (processor) for processing the images photographed by the photographing module 1 to obtain processed images (panoramic pictures or panoramic videos), and a communication module for transmitting the images photographed by the photographing module 1 or the images processed by the processing module to a remote terminal. As a result, the images photographed by the photographing module 1 are stored in the storage module of the host module 25, or the images photographed are directly stored in the aircraft. Of course, in some embodiments, the images also are directly transmitted to a user terminal through the communication module.

In some embodiments, the panoramic photographing device shares a power supply with the aircraft without being provided with a battery module, thereby further reducing the weight of the aircraft. In some embodiments, the panoramic photographing device further includes a power supply for supplying power to the host module 25 or/and the photographing module, and the power supply may be arranged in the bracket 2 or built in the host module 25 or arranged at other suitable places.

The embodiment of the present application further discloses a photographing method, which adopts the panoramic photographing device described herein and includes the following steps:

acquiring a first image in a first direction by the first photographing module 11 of the panoramic photographing device, and acquiring a second image in a second direction by the second photographing module 12 of the panoramic photographing device;

receiving the first image (picture or video) and the second image (picture or video) of the first photographing module 11 and the second photographing module 12 by a processing module of the panoramic photographing device or the aircraft, and combining the first image and the second image to form a panoramic image (panoramic picture or panoramic video) and sending the panoramic image to a remote terminal; or receiving the first image and the second image of the first photographing module 11 and the second photographing module 12 by the remote terminal and combining the first image and the second image to form a panoramic image.

An embodiment of the present application further discloses an aircraft, as shown in FIG. 1 to FIG. 17, which includes an aircraft body 3 and the photographing device described above. The bracket 2 is connected to the aircraft body 3; that is, the bracket 2 is suitable for being installed and detachably fixed on a part of the aircraft body. In this embodiment, the upper and lower ends of the bracket 2 are located above and below the aircraft body 3, respectively. The first photographing module 11 is installed at the upper end of the bracket 2 and faces the upper part of the aircraft, and the second photographing module 12 is installed at the lower end of the bracket 2 and faces the lower part of the aircraft. In some embodiments, the structure and mounting method of the bracket 2 is set according to actual situations, the structure of the aircraft also is selected according to actual situations, and the aircraft is a fixed-wing aircraft or a rotary-wing aircraft or the like.

In some embodiments, as shown in FIG. 10, the position of the first photographing module 11 satisfies the following condition: $H1 > L1/\tan \alpha 1$, wherein when the first photographing module 11 is adjusted along the central axis of the lens so that the line of sight corresponding to the maximum viewing angle has an intersection point with the aircraft and the first photographing module 11 is farthest from the aircraft, the intersection point of the line of sight corresponding to the maximum viewing angle (which is greater than 180 degrees) of the first photographing module 11 and the aircraft is a first farthest point C1, L1 is a vertical line segment from the first farthest point C1 to the central axis of the lens of the first photographing module 11, the farthest point has a first foot of a perpendicular B1 with the central axis of the lens of the first photographing module, $\alpha 1$ is an angle (which is smaller than 90 degrees) included between the line of sight corresponding to the maximum viewing angle of the first photographing module 11 and the central axis of the lens, the maximum viewing angle (which is set to be X) of the first photographing module 11 is greater than 180 degrees, the included angle ($\alpha 1$) is an acute angle, and $\alpha 1 = 0.5*(360-X)$, and H1 is a distance between the central point A1 of the lens of the first photographing module 11 (when the first photographing module 11 is located at the actually mounted position) and the first foot of a perpendicular B1.

The position of the second photographing module 12 satisfies the following condition: $H2 > L2/\tan \alpha 2$, wherein when the second photographing module 12 is adjusted along the central axis of the lens so that the line of sight corresponding to the maximum viewing angle (which is greater than 180 degrees) has an intersection point with the aircraft and the second photographing module 12 is farthest from the aircraft, the intersection point of the line of sight corresponding to the maximum viewing angle of the second photographing module 12 and the aircraft is a second farthest point C2, L2 is a vertical line segment from the second farthest point C2 to the central axis of the lens of the second photographing module 12, the second farthest point C2 has a second foot of a perpendicular B2 with the central axis of the lens of the second photographing module 12, $\alpha 2$ is an angle (which is smaller than 90 degrees) included between the line of sight corresponding to the maximum viewing angle of the second photographing module 12 and the central axis of the lens, the maximum viewing angle (which is set to be X) of the second photographing module 12 is greater than 180 degrees, the included angle ($\alpha 2$) is an acute angle, and $\alpha 2 = 0.5*(360-X)$, and H2 is a distance between the central point A2 of the lens of the second photographing module 12 (when the second photographing module 12 is located at the actually mounted position) and the second foot of a perpendicular B2.

In some embodiments, as shown in FIG. 10, the first farthest point C1 is at the tip of the rotor of the aircraft. That is, under the premise that the position of the first photographing module 11 is adjusted along the central axis of the lens so that the line of sight corresponding to the maximum viewing angle of the first photographing module 11 has an intersection point with the aircraft, when the first photographing module 11 is farthest from the aircraft along the central axis of the lens, the intersection point of the line of sight corresponding to the maximum viewing angle of the first photographing module 11 and the aircraft is located at the tip of the rotor of the aircraft, i.e., C1. C1 has a first foot of a perpendicular B1 with the central axis of the lens, L1 is a vertical line segment C1 B1 from the first farthest point C1 to the central axis of the lens of the first photographing module 11, $\alpha 1$ is an angle (which is smaller than 90 degrees) included between the line of sight corresponding to the maximum viewing angle of the first photographing module 11 and the central axis of the lens, the maximum viewing angle (which is set to be X) of the first photographing module 11 is greater than 180 degrees, the included angle ($\alpha 1$) is an acute angle, and $\alpha 1 = 0.5*(360-X)$, and H1 is a distance between the central point A1 of the lens of the first photographing module 11 and the first foot of a perpendicular B1.

Similarly, the second farthest point C2 also is at the tip of the rotor of the aircraft. That is, under the premise that the position of the second photographing module 12 is adjusted along the central axis of the lens so that the line of sight corresponding to the maximum viewing angle of the second photographing module 12 has an intersection point with the aircraft, when the second photographing module 12 is farthest from the aircraft along the central axis of the lens, the intersection point of the line of sight corresponding to the maximum viewing angle of the second photographing module 12 and the aircraft is located at the tip of the rotor of the aircraft, i.e., C2. C2 has a second foot of a perpendicular B2 with the central axis of the lens, L2 is a vertical line segment C2 B2 from the second farthest point C2 to the central axis of the lens of the second photographing module 12, $\alpha 2$ is an angle (which is smaller than 90 degrees) included between the line of sight corresponding to the maximum viewing angle of the second photographing module 12 and the central axis of the lens, the maximum viewing angle (which is set to be X) of the second photographing module 12 is greater than 180 degrees, the included angle ($\alpha 2$) is an acute angle, and $\alpha 2=0.5*(360-X)$, and H2 is a distance between the central point A2 of the lens of the second photographing module 12 (when the second photographing module 12 is located at the actually mounted position) and the second foot of a perpendicular B2.

Figure 11:
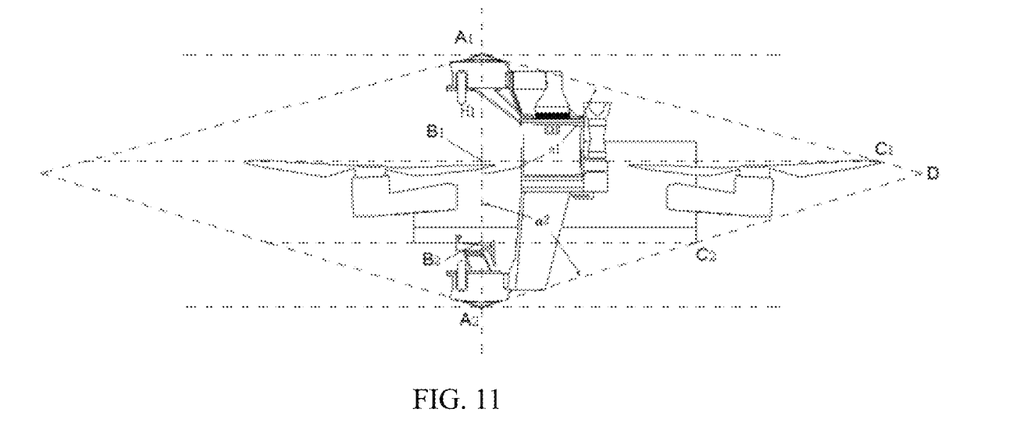
FIG. 11 is a schematic view illustrating another line-of-sight analysis of a photographing module in an aircraft according to an embodiment of the present application.
Figure 12:
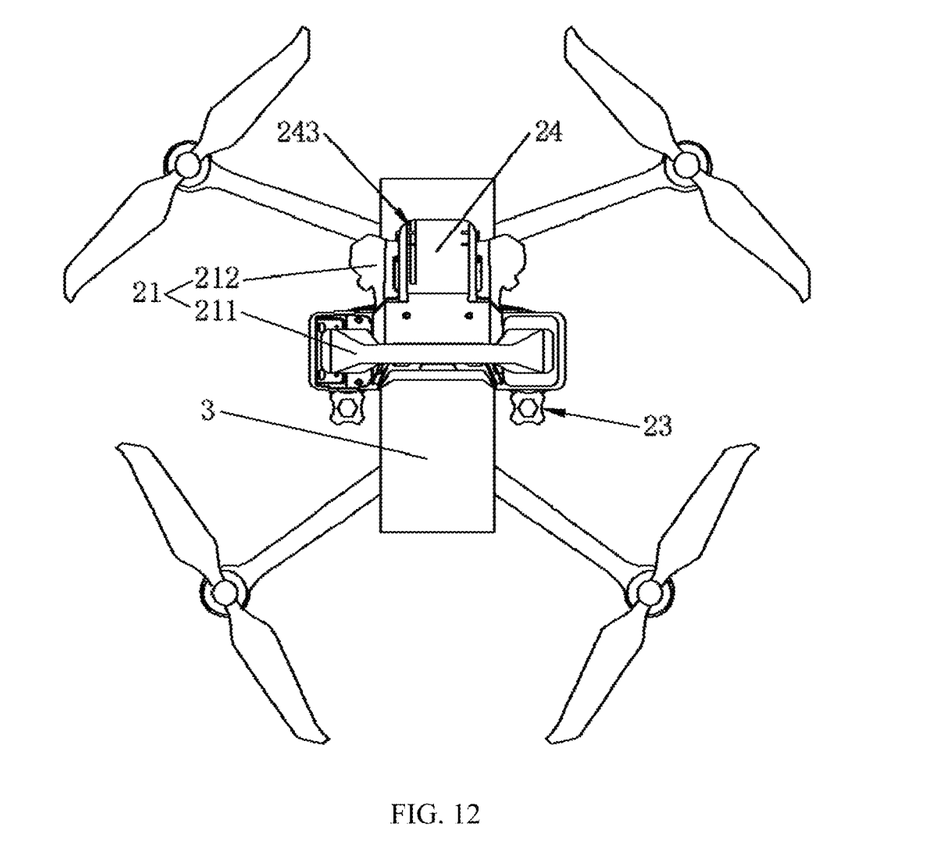
FIG. 12 is a top view of an aircraft according to an embodiment of the present application.
Figure 13:
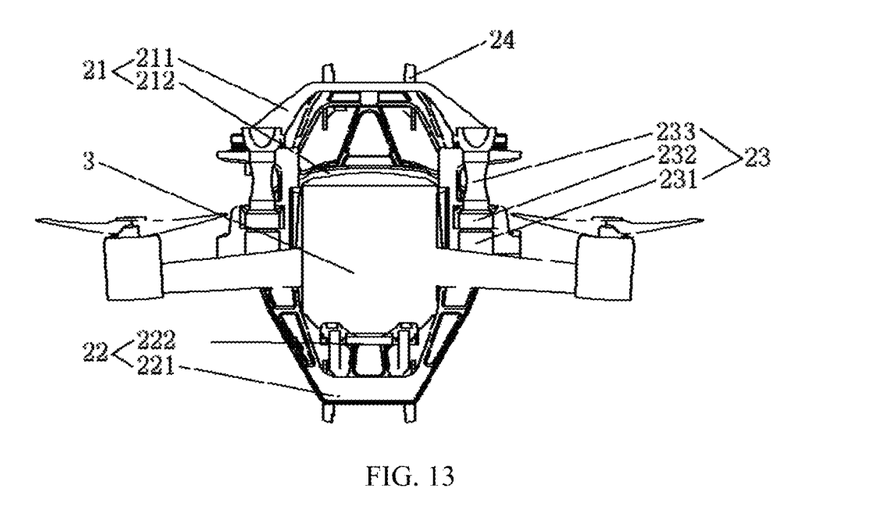
FIG. 13 is a rear view of an aircraft according to an embodiment of the present application.
Figure 14:
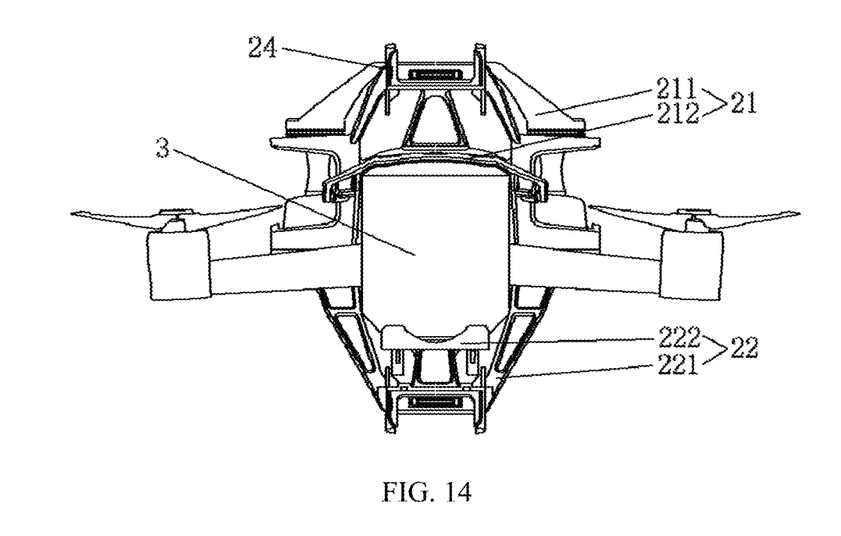
FIG. 14 is a front view of an aircraft according to an embodiment of the present application.
Figure 15:
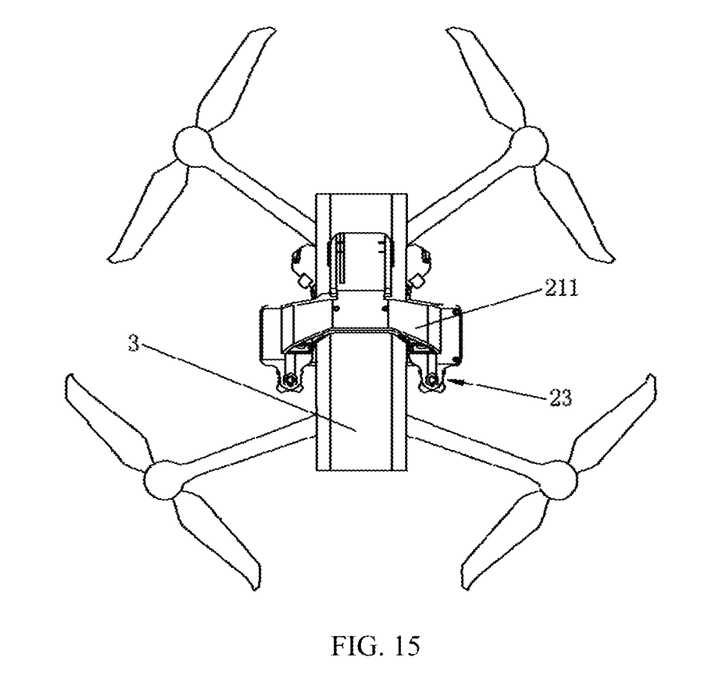
FIG. 15 is a bottom view of an aircraft according to an embodiment of the present application.
Figure 16:
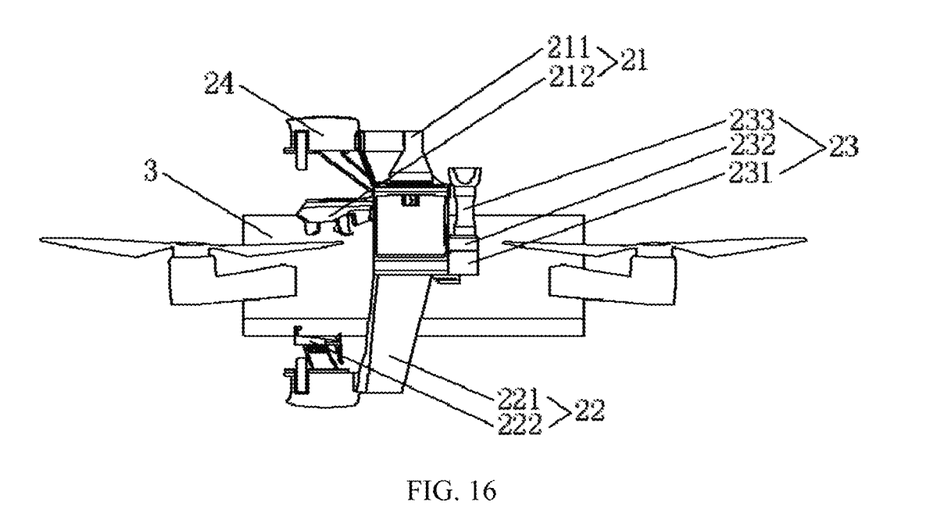
FIG. 16 is a left view of an aircraft according to an embodiment of the present application.
Figure 17:
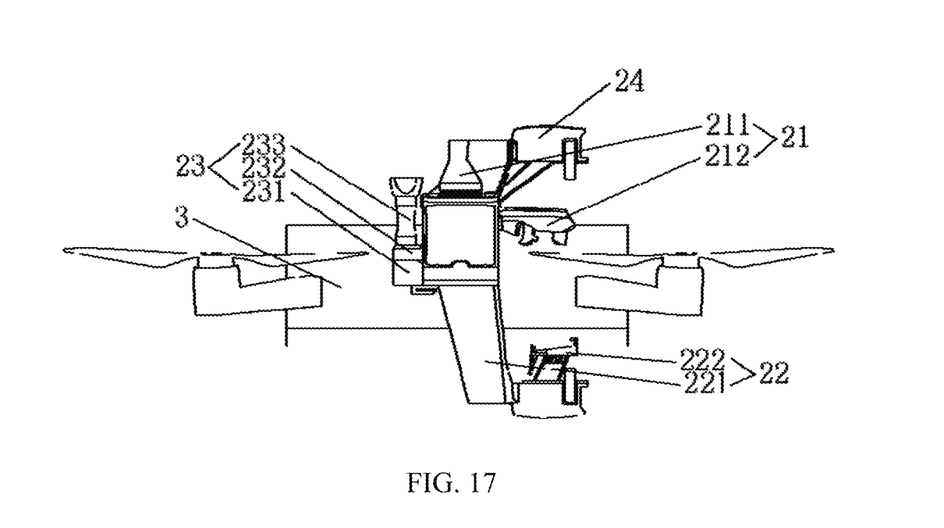
FIG. 17 is a right view of an aircraft according to an embodiment of the present application.

In some embodiments, as shown in FIG. 11, the first farthest point C1 and the second farthest point C2 are located at the shell of the aircraft or at other places, C1 has a first foot of a perpendicular B1 with the central axis of the lens, L1 is a vertical line segment C1 B1 from the first farthest point C1 to the central axis of the lens of the first photographing module 11, $\alpha 1$ is an angle (which is smaller than 90 degrees) included between the line of sight corresponding to the maximum viewing angle of the first photographing module 11 and the central axis of the lens, the maximum viewing angle (which is set to be X) of the first photographing module 11 is greater than 180 degrees, the included angle ($\alpha 1$) is an acute angle, and $\alpha 1=0.5*(360-X)$, and H1 is a distance between the central point A1 of the lens of the first photographing module 11 and the first foot of a perpendicular B1. The second farthest point C2 is located at the corner of the shell of the aircraft, the second farthest point C2 has a second foot of a perpendicular B2 with the central axis of the lens, L2 is a vertical line segment C2 B2 from the second farthest point C2 to the central axis of the lens of the second photographing module 12, $\alpha 2$ is an angle (which is less than 90 degrees) included between the line of sight corresponding to the maximum viewing angle of the second photographing module 12 and the central axis of the lens, the maximum viewing angle (which is set to be X) of the second photographing module 12 is greater than 180 degrees, the included angle ($\alpha 2$) is an acute angle, and $\alpha 2=0.5*(360-X)$, and H2 is a distance between the central point A2 of the lens of the second photographing module 12 (when the second photographing module 12 is located at the actually mounted position) and the second foot of a perpendicular B2. The lines of sight corresponding to the maximum viewing angles of the first photographing module 11 and the second photographing module 12 intersect at the peripheral side (point D) of the aircraft body 3.

An embodiment of the present application further discloses a panoramic photographing system, which includes the panoramic photographing device described above and a remote terminal for receiving images sent by the panoramic photographing device. In some embodiments, the remote terminal is a terminal computer, a cloud server, a remote controller, a mobile phone, a tablet computer or the like. In some embodiments, the panoramic photographing device includes a host module 25, and the images photographed by the photographing module 1 are stored in the host module 25 or directly sent to the remote terminal. In some embodiments, the host module 25 directly send the images to the remote terminal, or the images are combined into a panoramic image by the processing module in the host module 25 and then sent to the remote terminal. In some embodiments, the panoramic photographing device share a power supply with the aircraft, or the panoramic photographing device is powered by an independent power supply.

In this embodiment, the remote terminal has a memory for storing the images photographed by the first photographing module and the second photographing module, and a processor for combining the images in the memory into a panoramic medium (including a 360-degree panoramic picture and a 360-degree panoramic video). The remote terminal further has a display device (display interface) for displaying the panoramic medium synthesized by the processor. Of course, in some embodiments, the memory is used for storing the panoramic medium synthesized by the processor.

The embodiment of the present application further discloses a panoramic photographing system, which includes the aircraft described above and a remote terminal for receiving images sent by the aircraft or the panoramic photographing device. The remote terminal is a terminal computer, a cloud server, a remote controller of an aircraft, a mobile phone, a tablet computer or the like. The panoramic photographing device or the aircraft body includes a host module 25, and the images photographed by the photographing module 1 are stored in the host module 25 or directly sent to the remote terminal. The host module 25 directly send the images to the remote terminal, or the images are combined into a panoramic image by the processing module in the host module 25 and then sent to the remote terminal.

In this embodiment, the remote terminal has a memory for storing the images photographed by the first photographing module and the second photographing module, and a processor for combining the images in the memory into a panoramic medium (including a 360-degree panoramic picture and a 360-degree panoramic video). The remote terminal further has a display device (display interface) for displaying the panoramic medium synthesized by the processor. Of course, in some embodiments the memory is used for storing the panoramic medium synthesized by the processor.

According to the panoramic photographing device, panoramic photographing system, photographing method and aircraft in the embodiments of the present application, when the aircraft flies to photograph panoramic photos or panoramic videos with the photographing device, the aircraft body 3 or the photographing device is hidden so that the aircraft body 3 or the photographing device will not appear in the photos or videos photographed by the photographing device, and the bracket fits with different unmanned aerial vehicles. By adjusting the size of the bracket (the adapter) and the distance between the fisheye camera (the photographing module) and the unmanned aerial vehicle, the requirements of panoramic aerial photography are met. In specific applications, the images acquired by the fisheye camera (the photographing module) are stored locally in the adapter or stored in the unmanned aerial vehicle, or direct communication connection with the remote terminal (such as a computer) is achieved to transmit the acquired images in real time. As a result, the panoramic photographing effect is great, and the post processing of the images is simpler.

What described above are only preferred embodiments of the present application, and are not intended to limit the present application. Any modifications, equivalent substitutions and improvements made within the spirit and principle of the present application shall be included in the scope claimed in the present application.

What is claimed is:

1. A panoramic photographing device, comprising:
   a bracket for being connected with an aircraft body;
   a photographing structure mounted on the bracket, the photographing structure comprising a first photographing structure disposed towards a first direction and a second photographing structure disposed towards a second direction, the first direction being opposite to the second direction, and a line of sight corresponding to the maximum viewing angle of the first photographing structure intersecting with a line of sight corresponding to the maximum viewing angle of the second photographing structure,
   wherein each of the first photographing structure and the second photographing structure comprises at least one fisheye camera, and the maximum viewing angle of the fisheye camera is greater than 180 degrees,
   a position of the first photographing structure satisfies the following condition: H1>L1/tanα1,
   wherein the line of sight corresponding to the maximum viewing angle of the first photographing structure has an intersection point with the aircraft, the intersection point is a first farthest point, L1 is a vertical line segment from the first farthest point to the central axis of the lens of the first photographing structure, and the first farthest point has a first foot of a perpendicular with the central axis of the lens of the first photographing structure, α1 is an angle included between the line of sight corresponding to the maximum viewing angle of the first photographing structure and the central axis of the lens, and α1=0.5*(360-X1), X1 is the maximum viewing angle of the first photographing. and H1 is a distance between the central point of the lens of the first photographing structure and the first foot of a perpendicular; and
   a position of the second photographing structure satisfies the following condition: H2>L2/tanα2,
   wherein the position of the second photographing structure satisfies the following condition: H2>L2/tanα2, wherein the line of sight corresponding to the maximum viewing angle of the second photographing structure has other intersection point with the aircraft, the intersection point is a second farthest point, L2 is a vertical line segment from the second farthest point to the central axis of the lens of the second photographing structure, and the second farthest point has a second foot of a perpendicular with the central axis of the lens of the second photographing structure, α2 is an angle included between the line of sight corresponding to the maximum viewing angle of the second photographing structure and the central axis of the lens, and α2=0.5*(360-X2), X2 is the maximum viewing angle of the first photographing, and H2 is a distance between the central point of the lens of the second photographing structure and the second foot of a perpendicular.

2. The panoramic photographing device according to claim 1, wherein neither the line of sight corresponding to the maximum viewing angle of the first photographing structure nor the line of sight corresponding to the maximum viewing angle of the second photographing structure intersects with the bracket and the aircraft body.

3. The panoramic photographing device according to claim 1, wherein the bracket comprises a first clamping part and a second clamping part; the first clamping part and the second clamping part are connected and form a clamping structure for clamping the aircraft body; or the bracket is connected to the aircraft body through a locking structure or a buckling structure.

4. The panoramic photographing device according to claim 3, wherein the first clamping part is integrally formed or formed by assembling at least two assembly pieces; the second clamping part is integrally formed or formed by assembling at least two assembly pieces.

5. The panoramic photographing device according to claim 3, wherein a fastening structure is arranged between the first clamping part and the second clamping part, and the fastening structure is a buckle or a threaded locking structure.

6. The panoramic photographing device according to claim 1, wherein the upper and lower ends of the bracket are respectively provided with mounting structures for mounting the photographing structure.

7. The panoramic photographing device according to claim 6, wherein the mounting structure is provided with an adjusting structure for adjusting the planar position or/and the longitudinal position of the photographing structure.

8. The panoramic photographing device according to claim 7, wherein the adjusting structure is a planar tripod head or a lifting tripod head.

9. The panoramic photographing device according to claim 1, wherein the panoramic photographing device further comprises a host structure arranged on the bracket, wherein the host structure comprises at least one of a storage structure for storing images photographed by the photographing structure modules, a processing structure for processing the images photographed by the photographing structure to obtain processed images, and a communication structure for transmitting the images photographed by the photographing structure or the images processed by the processing structure to a remote terminal.

10. The panoramic photographing device according to claim 9, wherein the panoramic photographing device further comprises a power supply for supplying power to the host structure or/and the photographing structure.

11. A photographing method, comprising:
    acquiring a first image in a first direction by a first photographing structure of a panoramic photographing device;
    acquiring a second image in a second direction by a second photographing structure of the panoramic photographing device;
    receiving the first image and the second image of the first photographing structure and the second photographing structure by a processing structure of the panoramic photographing device or an aircraft, and combining the first image and the second image to form a panoramic image and sending the panoramic image to a remote terminal; or receiving the first image and the second image of the first photographing structure and the second photographing structure by the remote terminal and combining the first image and the second image to form a panoramic image;
    wherein the panoramic photographing device comprises:
    a bracket for being connected with an aircraft body;
    a photographing structure mounted on the bracket, the photographing structure comprising the first photographing structure disposed towards a first direction and the second photographing structure disposed towards a second direction, the first direction being opposite to the second direction, and a line of sight corresponding to the maximum viewing angle of the first photographing structure intersecting with a line of sight corresponding to the maximum viewing angle of the second photographing structure, a position of the first photographing structure satisfies the following condition: H1>L1/tanα1, wherein the line of sight corresponding to the maximum viewing angle of the first photographing structure has an intersection point with the aircraft, the intersection point is a first farthest point, L1 is a vertical line segment from the first farthest point to the central axis of the lens of the first photographing structure, and the first farthest point has a first foot of a perpendicular with the central axis of the lens of the first photographing structure, al is an angle included between the line of sight corresponding to the maximum viewing angle of the first photographing structure and the central axis of the lens, and α1=0.5*(360−X1), X1 is the maximum viewing angle of the first photographing, and H1 is a distance between the central point of the lens of the first photographing structure and the first foot of a perpendicular; and a position of the second photographing structure satisfies the following condition: H2>L2/tanα2, wherein the position of the second photographing structure satisfies the following condition: H2>L2/tanα2, wherein the line of sight corresponding to the maximum viewing angle of the second photographing structure has other intersection point with the aircraft, the intersection point is a second farthest point, L2 is a vertical line segment from the second farthest point to the central axis of the lens of the second photographing structure, and the second farthest point has a second foot of a perpendicular with the central axis of the lens of the second photographing structure, α2 is an angle included between the line of sight corresponding to the maximum viewing angle of the second photographing structure and the central axis of the lens, and α2=0.5*(360−X2), X2 is the maximum viewing angle of the first photographing, and H2 is a distance between the central point of the lens of the second photographing structure and the second foot of a perpendicular.

12. An aircraft comprising an aircraft body and, a panoramic photographing device;

wherein the panoramic photographing device comprises:

a bracket for being connected with the aircraft body;

a photographing structure mounted on the bracket, the photographing structure comprising a first photographing structure disposed towards a first direction and a second photographing structure disposed towards a second direction, the first direction being opposite to the second direction, and a line of sight corresponding to the maximum viewing angle of the first photographing structure intersecting with a line of sight corresponding to the maximum viewing angle of the second photographing structure, wherein each of the first photographing structure and the second photographing structure comprises at least one fisheye camera, and the maximum viewing angle of the fisheye camera is greater than 180 degrees, a position of the first photographing structure satisfies the following condition: H1>L1/tanα1.

wherein the line of sight corresponding to the maximum viewing angle of the first photographing structure has an intersection point with the aircraft, the intersection point is a first farthest point, L1 is a vertical line segment from the first farthest point to the central axis of the lens of the first photographing structure, and the first farthest point has a first foot of a perpendicular with the central axis of the lens of the first photographing structure, al is an angle included between the line of sight corresponding to the maximum viewing angle of the first photographing structure and the central axis of the lens, and α1-0.5*(360−X1), X1 is the maximum viewing angle of the first photographing, and H1 is a distance between the central point of the lens of the first photographing structure and the first foot of a perpendicular; and a position of the second photographing structure satisfies the following condition: H2>L2/tanα2.

wherein the position of the second photographing structure satisfies the following condition: H2>L2/tanα2, wherein the line of sight corresponding to the maximum viewing angle of the second photographing structure has other intersection point with the aircraft, the intersection point is a second farthest point, L2 is a vertical line segment from the second farthest point to the central axis of the lens of the second photographing structure, and the second farthest point has a second foot of a perpendicular with the central axis of the lens of the second photographing structure, α2 is an angle included between the line of sight corresponding to the maximum viewing angle of the second photographing structure and the central axis of the lens, and α2=0.5*(360−X2), X2 is the maximum viewing angle of the first photographing, and H2 is a distance between the central point of the lens of the second photographing structure and the second foot of a perpendicular.

13. The aircraft according to claim 12, wherein neither the line of sight corresponding to the maximum viewing angle of the first photographing structure nor the line of sight corresponding to the maximum viewing angle of the second photographing structure intersects with the bracket and the aircraft body.

14. The aircraft according to claim 12, wherein the bracket comprises a first clamping part and a second clamping part; the first clamping part and the second clamping part are connected and form a clamping structure for clamping the aircraft body; or the bracket is connected to the aircraft body through a locking structure or a buckling structure.

15. The aircraft according to claim 14, wherein the first clamping part is integrally formed or formed by assembling at least two assembly pieces; the second clamping part is integrally formed or formed by assembling at least two assembly pieces.

16. The aircraft according to claim 14, wherein a fastening structure is arranged between the first clamping part and the second clamping part, and the fastening structure is a buckle or a threaded locking structure.

17. The aircraft according to claim 12, wherein the upper and lower ends of the bracket are respectively provided with mounting structures for mounting the photographing structure.

18. The aircraft according to claim 17, wherein the mounting structure is provided with an adjusting structure for adjusting the planar position or/and the longitudinal position of the photographing structure.

* * * * *